US012447638B2

(12) United States Patent
Roth

(10) Patent No.: US 12,447,638 B2
(45) Date of Patent: Oct. 21, 2025

(54) SHAVING AND GROOMING APPARATUS

(71) Applicant: Daniel Lawrence Roth, Newton, MA (US)

(72) Inventor: Daniel Lawrence Roth, Newton, MA (US)

( * ) Notice: Subject to any disclaimer, the term of this patent is extended or adjusted under 35 U.S.C. 154(b) by 120 days.

(21) Appl. No.: 17/535,642

(22) Filed: Nov. 25, 2021

(65) Prior Publication Data

US 2022/0080608 A1 Mar. 17, 2022

Related U.S. Application Data

(63) Continuation of application No. 16/517,565, filed on Jul. 20, 2019, now Pat. No. 11,203,126, which is a (Continued)

(51) Int. Cl.
*B26B 19/38* (2006.01)
*B26B 19/04* (2006.01)

(Continued)

(52) U.S. Cl.
CPC .......... *B26B 19/384* (2013.01); *B26B 19/042* (2013.01); *B26B 19/06* (2013.01);

(Continued)

(58) Field of Classification Search
CPC . B26B 19/384; B26B 19/042; B26B 21/4087; B26B 19/3846; B26B 21/4081; B26B 19/06

(Continued)

(56) References Cited

U.S. PATENT DOCUMENTS 1,780,276 A * 11/1930 Scheiwer ................ B26B 19/06 30/223
1,791,228 A * 2/1931 Scheiwer ................ B26B 19/06 30/225

(Continued)

FOREIGN PATENT DOCUMENTS

DE 202013103187 U1 7/2013
JP 2000-084270 A 3/2000
WO 2009/052952 A1 4/2009

OTHER PUBLICATIONS

International Search Report and Written Opinion received for PCT Patent Application No. PCT/US2014/072727, mailed on Apr. 22, 2015, 24 pages.

(Continued)

*Primary Examiner* — Ghassem Alie
(74) *Attorney, Agent, or Firm* — Rauschenbach Patent Law Group, PLLC; Kurt Rauschenbach

(57) ABSTRACT

A shaving and grooming apparatus includes a handle and a cartridge attached to the handle. A plurality of upper blades are positioned in the cartridge, where at least some of the plurality of upper blades include curved tips with a curvature that sufficient to prevent the curved tips from contact a cutting surface during use. A plurality of lower blades is positioned adjacent to the plurality of upper blades in the cartridge, where at least some of the plurality of lower blades comprises curved tips with a curvature that sufficient to prevent the curved tips from contact a cutting surface during cutting. At least one of the plurality of upper and the plurality of lower blades has a thickness and flexibility that results in deflection during cutting that increases effectiveness of cutting action. A drive motor moves the plurality of upper blades relative to the plurality of lower blades.

19 Claims, 12 Drawing Sheets

Related U.S. Application Data continuation of application No. 14/586,158, filed on Dec. 30, 2014, now Pat. No. 10,391,648.

(60) Provisional application No. 61/922,830, filed on Jan. 1, 2014.

(51) Int. Cl.
*B26B 19/06* (2006.01)
*B26B 21/40* (2006.01)

(52) U.S. Cl.
CPC ...... *B26B 19/3846* (2013.01); *B26B 21/4081* (2013.01); *B26B 21/4087* (2013.01)

(58) Field of Classification Search
USPC ..... 30/223, 224, 225, 355, 45, 49; 76/101.1, 76/104.1
See application file for complete search history.

(56) References Cited

U.S. PATENT DOCUMENTS

| | | | | |
|---|---|---|---|---|
| 2,077,367 | A | 4/1937 | Hanley | |
| 2,125,748 | A * | 8/1938 | Rabald | B26B 19/32 185/40 S |
| 2,345,695 | A | 4/1944 | Andis | |
| 2,406,986 | A * | 9/1946 | Anderson | B26B 19/066 30/213 |
| 2,911,715 | A | 11/1959 | Seifert | |
| 4,118,863 | A | 10/1978 | Sandy | |
| 4,348,810 | A | 9/1982 | Oda et al. | |
| 4,512,077 | A | 4/1985 | Tanabe et al. | |
| 4,899,444 | A | 2/1990 | Trichell et al. | |
| 5,054,199 | A | 10/1991 | Ogawa et al. | |
| 5,606,799 | A | 3/1997 | Melton | |
| 5,933,960 | A | 8/1999 | Avidor | |
| 5,946,806 | A | 9/1999 | Watanabe et al. | |
| 6,082,004 | A * | 7/2000 | Hotani | B26B 19/042 30/346.51 |
| 6,405,439 | B1 | 6/2002 | Malobabic et al. | |
| 6,442,840 | B2 | 9/2002 | Zucker | |
| 6,571,665 | B2 | 6/2003 | Julien | |
| 6,658,740 | B2 | 12/2003 | Habben | |
| 7,244,783 | B2 | 7/2007 | Lean et al. | |
| 7,426,785 | B2 | 9/2008 | Ho | |
| 7,540,088 | B2 | 6/2009 | Takeshita | |
| 8,479,400 | B2 | 7/2013 | Fukutani et al. | |
| 8,726,517 | B2 | 5/2014 | Lau | |
| 8,850,707 | B2 | 10/2014 | Maichel et al. | |
| 8,850,709 | B2 | 10/2014 | Nikas | |
| 9,266,245 | B2 | 2/2016 | Kammer et al. | |
| 9,381,655 | B2 | 7/2016 | Lau | |
| 10,391,648 | B2 | 8/2019 | Roth | |
| 2002/0083595 | A1 | 7/2002 | Ullmann | |
| 2002/0129496 | A1 * | 9/2002 | Habben | B26B 19/06 30/45 |
| 2004/0200077 | A1 | 10/2004 | Liao et al. | |
| 2005/0055834 | A1 | 3/2005 | Cheah et al. | |
| 2005/0138814 | A1 | 6/2005 | Pennella et al. | |
| 2005/0198826 | A1 | 9/2005 | Segrea | |
| 2006/0162516 | A1 | 7/2006 | Andis et al. | |
| 2007/0213742 | A1 | 9/2007 | Callahan | |
| 2007/0214654 | A1 | 9/2007 | Chen et al. | |
| 2008/0086888 | A1 | 4/2008 | Scheinfeld | |
| 2008/0168661 | A1 * | 7/2008 | Lau | B26B 19/06 30/208 |
| 2008/0209741 | A1 * | 9/2008 | Chen | B26B 19/06 30/238 |
| 2008/0263869 | A1 * | 10/2008 | Floessholzer | B26B 19/06 30/346.51 |
| 2009/0000125 | A1 | 1/2009 | Peyser et al. | |
| 2011/0010942 | A1 | 1/2011 | Lau | |
| 2011/0167639 | A1 | 7/2011 | Lau | |
| 2011/0167640 | A1 | 7/2011 | Flyash et al. | |
| 2011/0173818 | A1 | 7/2011 | Lacov et al. | |
| 2011/0197726 | A1 | 8/2011 | Kraus | |
| 2012/0110859 | A1 | 5/2012 | Kammer | |
| 2012/0233865 | A1 | 9/2012 | Kammer | |
| 2012/0233866 | A1 | 9/2012 | Kammer | |
| 2012/0240409 | A1 | 9/2012 | Inoue et al. | |
| 2013/0192068 | A1 | 8/2013 | Kammer et al. | |
| 2014/0102271 | A1 * | 4/2014 | Krenik | B26B 19/388 83/13 |
| 2015/0183118 | A1 | 7/2015 | Roth et al. | |
| 2019/0366569 | A1 | 12/2019 | Roth | |

OTHER PUBLICATIONS http://pedewei.home.xs4all.nl/index.htm, Electric Shaver Museum, 1999-2011, 1 page, downloaded Oct. 20, 2015.
www.fulltable.com/vts/f/fortune/menu.htm, Fortune Magazine, May 1938, p. 70-71, downloaded Oct. 20, 2015.
International Preliminary Report on Patentability (Chapter I) received for PCT Patent Application No. PCT/US2014/072727 mailed on Jul. 14, 2016, 21 pages.

* cited by examiner

SHAVING AND GROOMING APPARATUS

RELATED APPLICATION SECTION

The present application is a continuation of U.S. patent application Ser. No. 16/571,565, filed on Jul. 20, 2019, entitled "Shaving and Grooming Apparatus", which is a continuation of U.S. patent application Ser. No. 14/586,158, filed on Dec. 30, 2014, entitled "Shaving and Grooming Apparatus", which is now U.S. Pat. No. 10,391,648, which is a non-provisional application of U.S. Provisional Application Ser. No. 61/922,830, filed on Jan. 1, 2014, entitled "Electric Trimmer". The entire contents of U.S. Pat. No. 10,391,648 and U.S. Provisional Patent Application No. 61/922,830 are herein incorporated by reference.

The section headings used herein are for organizational purposes only and should not to be construed as limiting the subject matter described in the present application in any way.

INTRODUCTION

The present teaching relates to a shaving and grooming apparatus and method of shaving and grooming hair. More specifically, the present teaching relates to electric trimmer devices. Conventional wedge shaped and sheet metal trimmers include two flat pieces of metal sliding on one another. Conventional v-shaped trimmers include cutting slots with rake angles or straight slots, which are always manufactured by cutting into a rigid member. The parts are typically formed of flat metal. All known trimmer systems are generally referred to in the art as "free hand" systems that require some level of operator skill.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The person skilled in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
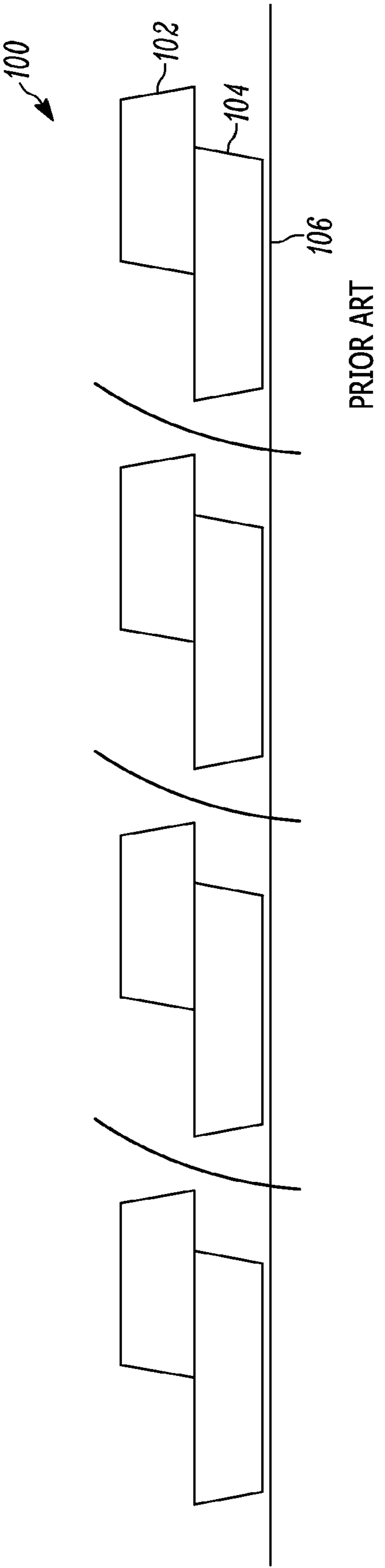
FIG. 1 shows a cross-sectional view of prior art trimmer blades cutting hair at the surface of the skin.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

Manufacturers of some electric shavers claim that their products are more convenient to use than wet shaving razors like, for example, the Gillette Mach 3 type, because they do not require skin preparation and the use of lubricating foams. In reality, electric shavers are not more convenient because they all suffer from an inability to cut every hair that they pass over. This is because electric shavers use rotary type and foil type cutter heads, which are known to be ineffective cutting heads. It is known in the art that relatively long hairs or hairs that lie relatively flat against the skin do not readily fall into the open areas of the cutting slots of rotary type shavers and thus are not cut effectively. This problem is well known in commercial razors such as the Philips Arcitec. Foil shavers, such as the Braun Series 7 shaver, have small circular openings in thin metal foils that can only accept short stubble-like hairs protruding upright from the skin. Consequently, foil shavers are not good at cutting longer hairs or hairs lying flat along the skin.

Some electric razor manufacturers have attempted to address the known problems with electric shavers with the use of mixed cutter heads. One type of mixed cutter head is an interlacing trimmer-type cutter head. One example of which is a linear open front-type head referred to as an intercept trimmer. For example, the Remington F5 foil cutter head includes intercept cutters that are relatively efficient at cutting hairs. However, this type of razor, like other known designs, has not been able to cut hairs to a desired shortness or "shaved" length for most users, which is less than 0.1 mm.

One aspect of the present teaching is the realization that known shavers, including shavers having interlaced cutter head arrangements, are unable to shave all hairs to a short enough length in a few cutting passes. It is believed that this limitation is due to the inability of foil and rotary shavers to reliably get hairs to line up with the cutter openings. One reason for this inability is that these cutting head arrangements all have a closed cutting architecture. The term "closed cutting architecture" is defined herein to mean that the cutting slots or openings are closed in by metal on all sides. The closed in geometry is a circle for the foil-type design and a rectangular slot for the rotary head design. It is believed that such razor head designs are fundamentally limited in that they will always have difficulty cutting substantially every hair in a few cutting passes because the hairs are deflected by some part of the cutting slot/hole.

Another type of cutting head known in the art as a trimmer-type cutter uses ridged metal blades which are specifically designed not to flex so that sufficient pressure can be created with an external spring that presses the upper moving or reciprocating blade against a rigid lower fixed blade, creating a scissoring-type action that cuts hair rather than pulls it. In order to provide sufficient rigidity, the lower blades of these trimmers have always been made of thick metal, usually greater than 0.4 mm. These trimmer-type cutting heads have superior performance in terms of being able to cut substantially all of the hairs that the blades pass over.

FIG. 1 shows a cross-sectional view of prior art trimmer blades 100 cutting hair at the surface of the skin. Prior art trimmer blades are generally made of two flat blades including an upper moving or reciprocating blade 102 disposed on top of a lower stationary blade 104. The prior art trimmer blades 100 have a near vertical cutting surface. In other words, the rake angle of the cutting surface is not acute. The metal cutting blades are relatively thick so the cutting edge rides above the skin surface. The upper moving blade 102 tip is a few millimeters away from the tips of the lower stationary blade 104. Consequently, if the user increases the trimmer's angle of attack or runs into a vulnerable skin area, such as inside the bend of an elbow, the moving upper blade 102 may come in contact with the skin causing skin damage and creating an opportunity for infection.

Prior art systems, such as the Andis Outiliner, that are used to create decorative beard patterns have lower blades with very narrow tip areas that taper to about 0.1 mm. Using these systems results in beard hair lengths of greater than 0.1 mm. However, this is substantially longer than consumers find acceptable for a shave. In comparison, electric rotary shavers are known to trim hairs to roughly 0.07 mm and foil type shavers are known to cut hairs to roughly 0.03 mm.

Trimmer-type cutting heads known in the art have numerous other disadvantages. For example, rigid trimmer blades generally have tooth shaped cutting elements that form a sharp point. These sharp points, when dragged along the skin, are known to create skin irritation and damage. These damaged skin areas are highly undesirable to the user because they can cause significant discomfort and put the user at risk for infection. Also, conventional trimmer blades are "open architecture cutters," meaning that the front face of the blades are open and the top blade is moving, thereby allowing the blades to capture and cut most hairs they encounter. One problem with conventional trimmer blades is that they are made of metal that must be thick enough to be rigid in order to create adequate cutting pressure, but this thickness also leaves the stubble that is generally considered unacceptably long by typical users.

For surgical applications, it is advantageous to remove all hairs from the surgical area. For such applications, trimmers offer advantages to blade shaving because blade shavers tend to nick the skin more often, creating opportunities for infection. Known trimmers do not substantially eliminate this risk because they have sharp points which can also damage the skin. Some manufacturers have proposed adding small spherical objects at the tips of the lower trimmer blade teeth to reduce the irritation and potential for skin damage. However, it has been shown that these objects do not eliminate the risk of skin damage.

The shaving and grooming apparatus of the present teaching overcomes many of the limitations of known shaving and grooming apparatus and methods by using an ultra-thin trimmer blade architecture with blades in the cutting region that are less than 0.1 mm, which are capable of shaving hairs to less than 0.1 mm from the surface of the skin. In general, the shaving and grooming apparatus of the present teaching includes many of the advantages of conventional trimmer technology without the disadvantages.

Although thin foil blades are commonly used in electric shavers, they are generally supported on two opposing sides in order to create sufficient tension between the foil and the reciprocating cutter below it to effectively cut hairs. In contrast, trimmer blades are not supported along the front cutting edge, which is why all previous trimmer blades are made of rigid metal have a thickness that is greater than 0.1 mm. Furthermore, prior art trimmer blades are specifically designed to be inflexible so that they are rigid enough to allow pressure to be created by springs used to press these rigid plates together.

Figure 2:
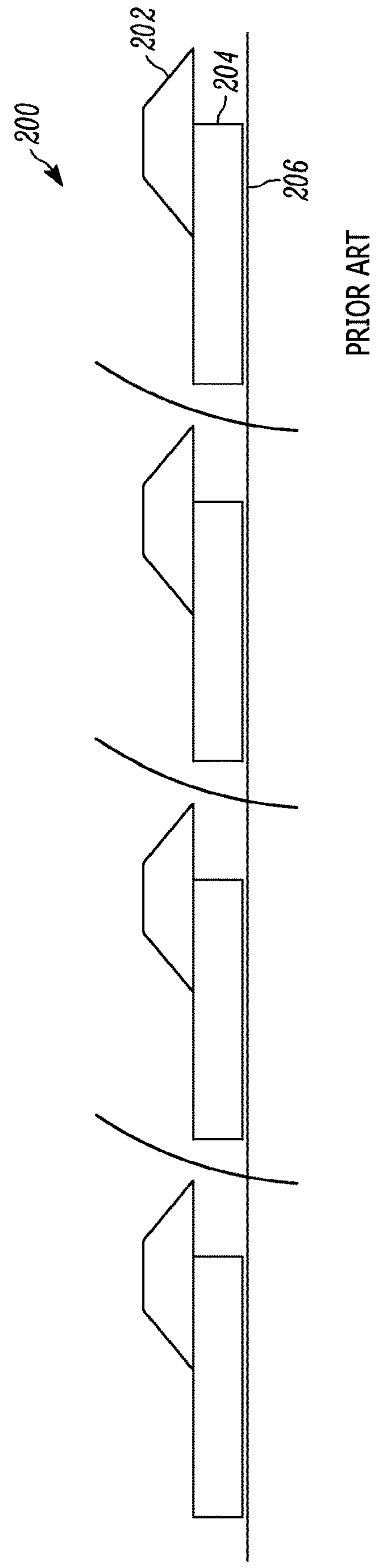
FIG. 2 illustrates a cross-sectional view of straight trimmer blades according to one aspect of the present teaching cutting hair at the surface of the skin.

Some aspects of the present invention are described in connection with a trimmer. However, it should be understood that the present invention is not limited to trimmers and can be applied to any type of shaving a grooming apparatus. FIG. 2 illustrates a cross-sectional view of straight trimmer blades 200 according to one aspect of the present teaching cutting hair at the surface of the skin. Similar to the trimmer blades 100 described in connection with FIG. 1, there are two flat blades. An upper moving blade 202 is disposed on top of a lower stationary blade 204. The trimmer blades 200 also have a near vertical cutting surface. That is, like the trimmer blades 100 described in connection with FIG. 1, the rake angle of the cutting surface is not acute. However, the prior art metal trimmer blades are relatively thin so that the cutting edge rides above the skin surface 106. In the trimmer blades 200 of the present teaching, the upper moving blade 202 tip is a fraction of a millimeter away from the tips of the lower stationary blade 204.

One feature of the shaving and grooming apparatus of the present teaching is that very thin blades can be used to greatly increase the effectiveness of the cut. For example, the lower blade 204 can be made from metal of less than 0.1 mm in thickness in the cutting area with the thickest section being in the range of 0.1-0.5 mm in some embodiments, such as a rib design. Using the very thin blades of the present teaching allows teeth in the upper and lower blades 202, 204 to be relatively stiff but still able to flex so that the blades are in intimate contact with the skin and each other for good cutting action when pressed against the skin.

In one particular embodiment, the upper and lower blades 202, 204 are made of a substantially uniform cross-section of material having a very thin thickness that is in the range of 0.09 mm-0.01 mm. In particular, using very thin upper and lower blades 202, 204 is advantageous because it allows the upper and lower trimmer blades 202, 204 to have a thinner lower foil that achieves a closer shave. In addition, using very thin upper and lower blades 202, 204 allow pressure contact with the skin that causes the blade to flex and press upward against the moving upper blade 202 for better cutting action. The lower blade 204, which is stationary in some embodiments, also uses pressure contact to provide mechanical stiffness.

In some embodiments of the shaving and grooming apparatus of the present teaching, the thin trimmer blades are thin enough to provide enough flexibility on the surface of the skin 206 to create a counter force against the trimmer blades. In these embodiments, when the trimmer blades are pressed against a skin surface 206, pressure is generated between the blades aiding the cut. This pressure is not necessary for the cut, but does improve the effectiveness of the cutting action. The cutting assistance and the resulting improvement in cutting effectiveness of the trimmer cannot be accomplished by a ridged blade design.

Reducing skin irritation during shaving is highly desirable. In various embodiments, the upper and lower blades are coated with hydrophilic coatings to reduce friction against the skin when they are wet. In various other embodiments, the upper and lower blades are coated with an inert material, such as gold. In yet other embodiments, the upper and lower blades are coated with polytetrafluoroethylene (PTFE) to form surfaces that will have low friction against the skin and or between the moving blades. Still straight blade geometries have a tendency to cause skin irritation so curved blade designs have some inherent advantage.

Some known shaving systems describe alternative ways to reduce irritation, such as adding ball shaped objects at the tips of the lower blade. However, these designs still use flat cutting blades and only somewhat reduce the irritation because the tips still drag against the skin.

Figure 3:
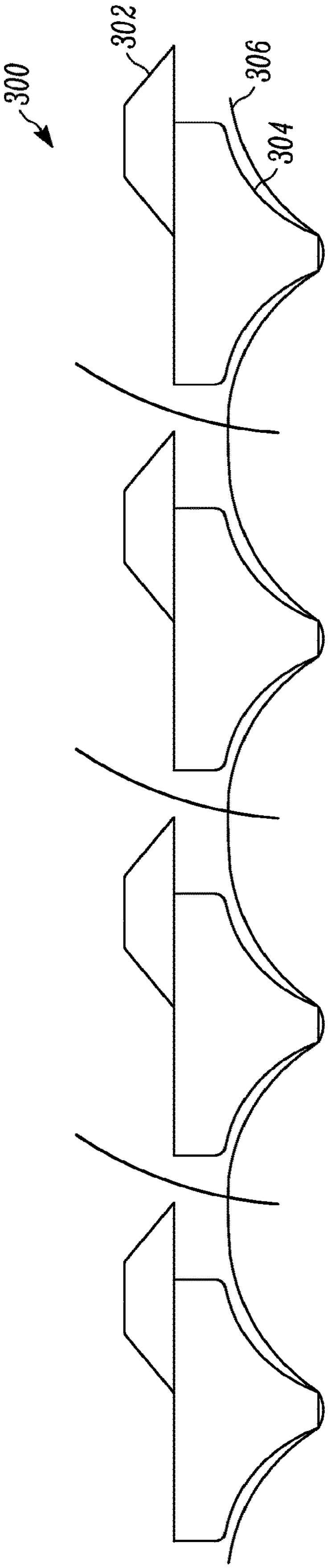
FIG. 3 illustrates a cross-sectional view of curved trimmer blades according to one aspect of the present teaching cutting hair at the surface of the skin.

FIG. 3 illustrates a cross-sectional view of curved trimmer blades 300, according to one aspect of the present teaching, cutting hair at the surface of the skin. Similar to the trimmer blades 200 described in connection with FIG. 2, there are two blades. An upper moving blade 302 is disposed on top of a lower curved stationary blade 304. Like the trimmer blades 200, the metal trimmer blades are relatively thin so that the cutting edge rides above the surface of the skin 306. In the trimmer blades 300, the upper moving blade 302 tip is a fraction of a millimeter away from the tips of the lower stationary blade 304. These very thin blades can be used to greatly increase the effectiveness of the cut. For example, the curved lower blade 304 can be made from metal of less than 0.1 mm in thickness in the cutting area. This feature allows teeth in the upper and lower blades 302, 304 to be stiff but still able to flex so that the blades are in intimate contact with the surface of the skin 306 and in intimate contact with each other for good cutting action when pressed against the surface of the skin 306.

A trimmer according to one aspect of the present invention uses curved or trapezoidal trimmer blades as shown in FIG. 3. Providing blade curvature offers many advantages over prior art blades in that it allows the tips of the trimmer blades to curve upward away from the surface of the skin 306 to avoid scraping the skin with the points or tips of the cutting fingers. With the electric trimmer according to the present teaching, the tips do not make contact with the surface of the skin 306 under normal use, which is highly advantageous because it allows the user to press down against the surface of the skin 306 to get a closer cut of the hair without causing skin damage, irritation, or undue friction on the tips of the cutting blades. In this embodiment, the blade tips may not even touch the skin 306, much like a curved ski tip that does not normally touch the snow. Furthermore, the curved shape of the trimmer blade tips has the advantage, like the ski tip, of riding on top of the surface of the skin 306 as shown in FIG. 3 as it is pulled by the user, such that a gliding, smooth motion can be obtained due to the elimination of the interference from the blade tip grabbing or digging into the skin 306.

In many embodiments, the thin trimmer blades 302, 304 are also thin enough to provide enough flexibility on the surface of the skin 306 to create a counter force against the trimmer blades. In these embodiments, when the trimmer blades are pressed against a skin 306 surface, pressure is generated between the blades aiding the cut. This pressure is not necessary for the cut, but does improve the effectiveness of the cut. One advantage of using thin curved lower blades 304 is that thin blades with curves, or bends can be "pre-loaded" during manufacturing, such that when the upper and lower blades are secured together in the apparatus, the opposing blade deforms slightly, creating pressure between the blades. In one embodiment, the radius of the bend in the lower blade 304 would be designed such that it would be smaller than the radius of the curve in the upper blades 302. When they are pressed together, the moving upper blades 304 causes the stationary lower blades 302 to "unfurl" somewhat, but also creates a pressure which is needed to cut hair.

In one embodiment, the stationary lower blades 304 are thinner than the moving upper blades 302. In this embodiment, the moving upper blades 302 are slightly stiffer than the stationary lower blade 304, so that when pressed together, the stationary lower blades 304 will open slightly to accept the upper moving blades 302.

In another embodiment, the stationary lower blades 304 are thicker than the upper reciprocating or moving blades 302. In this embodiment, the upper moving blades 304 are slightly less stiff than the stationary lower blade 302, so that when pressed together, the upper moving blades 304 will open slightly to accept the stationary lower blades 302.

In addition to differences in stiffness in the upper and lower blades 302, 304, in various embodiments, the upper and lower blades 302, 304 can have different levels of sharpness. For example, in one embodiment, the moving upper blades 302 are sharper with a much more aggressive cutting edge angle compared with the lower stationary blades 304.

In various embodiments, the upper and lower blades 302, 304 are formed of one or more of a variety of metals that include various types and grades of steel, spring steel, stainless steel, surgical steel as well as ceramic materials, and tungsten carbide. In various embodiments, the upper and lower blades 302, 304 can be formed of different materials. In some of these embodiments, the different materials are chosen so as to provide different relative degrees of sharpness. For example, in one particular embodiment, the moving upper blades 302 are formed of a material, such as a ceramic, that provides a higher level of sharpness compared with conventional metal that is used to form the stationary lower blades 304. In another particular embodiment, one or both of the upper and lower blades 302, 304 are formed by chemical or reactive ion beam etching so as to create the desired relative difference in sharpness.

Figure 4:
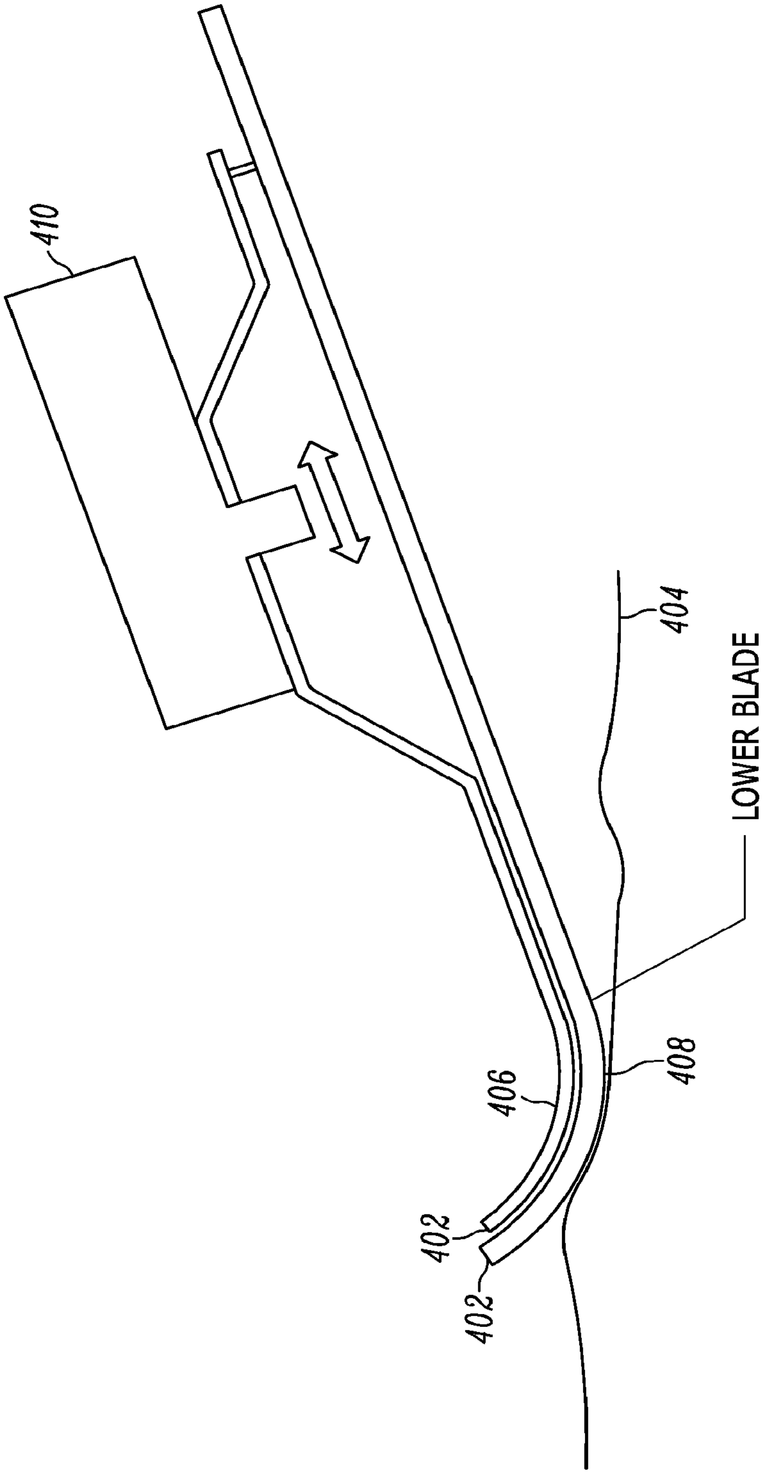
FIG. 4 illustrates a simplified cross-section of an electric trimmer according to the present teaching showing that the curved tip prevents the blade from digging into the skin.

FIG. 4 illustrates a simplified cross-section of an electric trimmer 400 according to the present teaching showing that the curved tip 402 prevents the blades from digging into the skin 404. The electric trimmer 400 illustrates the moving curved upper blades 406 and stationary curved lower blades 408 contacting the surface of the skin 404. The motor 410 is shown to move the upper blade 406 back and forth in a reciprocating motion. The curved tips 402 of the upper and lower blades 406, 408 have radiuses that are designed to prevent the blades from digging into the skin 404. One aspect of the present teaching sets the angle and pressure against the surface of the skin 404 with the curvature of the upper and lower blades 406, 408. The curved shape also allows for a more even distribution of pressure against the skin 404.

This is in contrast to known trimmer systems that require the user to manually adjust the angle of the blade against the surface of the skin 404 to attempt to locate an optimal or at least an acceptable cutting angle, and to find an optimum amount of pressure contact with the skin 404. When the blade tips of the known trimmers are in contact with the skin 404, the pressure is increased by the small surface area of the point. This additional localized pressure can lead to undesirable skin damage and irritation. The flat bottoms of the curved cutting blades of the present teaching touch the skin 404 and distribute the pressure more evenly across their surface areas rather compared with the small area points of known cutting blades.

The flexing pressure provided by the curved upper and lower blades 406, 408 of the present teaching causes the upper and lower blades 406, 408 to squeeze together for better cutting performance. In some embodiments, the trimmer blades of the current teaching are both flexible and are designed to interfere with each other in their unassembled state. In their assembled state, these trimmer blades flex to accommodate the presence of the opposite blade creating intimate pressure contact between the two blades resulting in blade thickness at the surface of the skin that are less than 0.1 mm in the cutting area. In some embodiments, the blade has a trailing edge which glides on skin to lift and cut flat-lying hairs.

Figure 5:
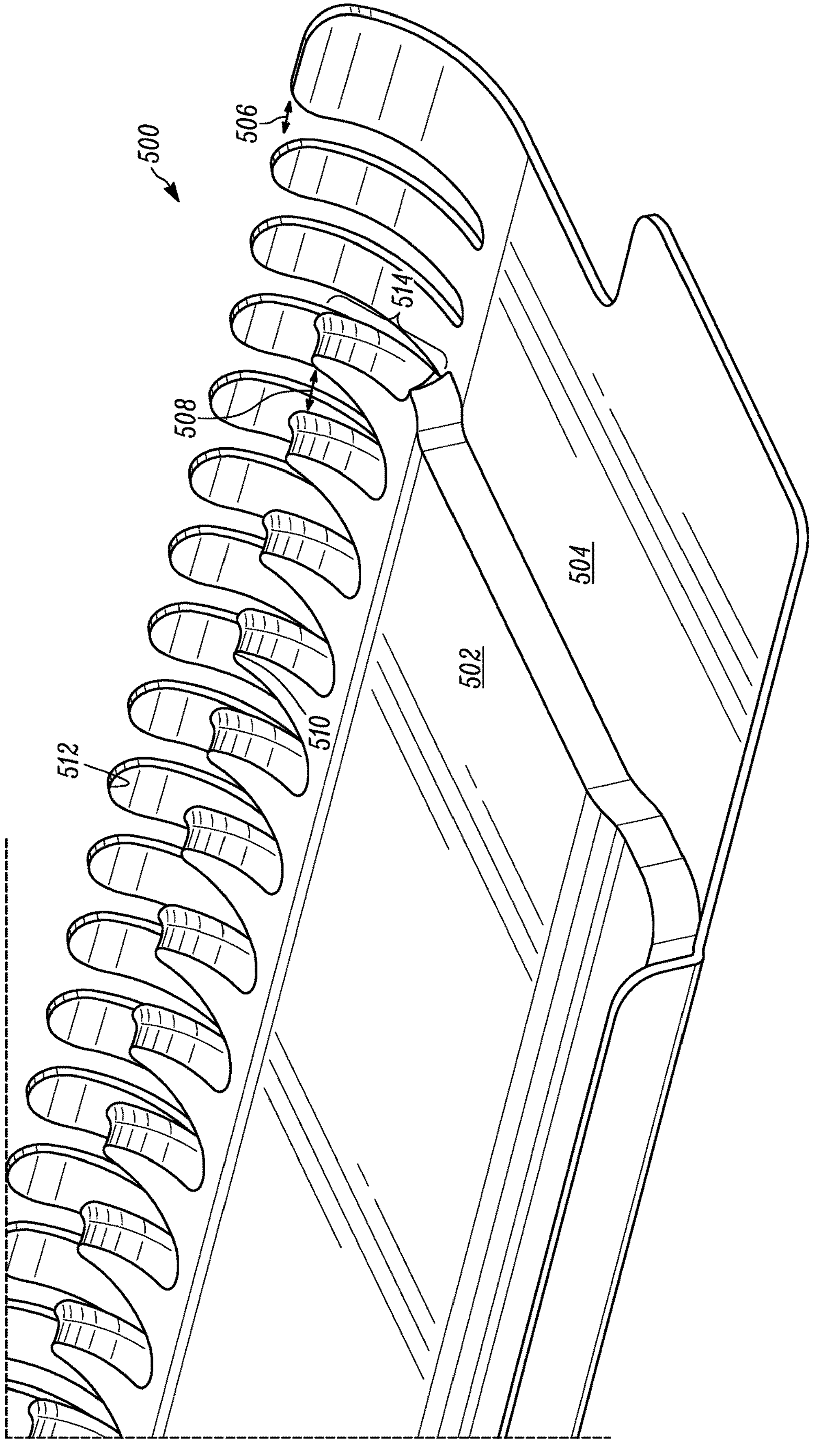
FIG. 5 illustrates a perspective top-view of a trimmer blade assembly according to one embodiment the present teaching that more clearly shows curved upper and lower blades and their relative position according to the present teaching.

FIG. 5 illustrates a perspective top-view of a trimmer blade assembly 500 according to one embodiment of the present teaching that more clearly shows curved upper and lower blades 502, 504 and their relative position according to the present teaching. The trimmer blade assembly 500 shows that the stationary lower blades 504 are curved so that they are in pressure contact with the curved moving upper blades 502. With this design, the stationary lower blades 504 can be mechanically supported by the moving upper blades 502, and can also be made to apply a spring force between the upper and the lower blades 502, 504 that improves cutting performance.

One aspect of the present teaching is the realization that known blades have cutting slots in the stationary lower blades that are narrower than the width of the teeth in the reciprocating or moving upper blades. It has been determined through testing with flexible blades that the teeth of the reciprocating or moving upper blades 502 will interfere with each other if the teeth are able to fit into the cutting slots 506, and that this interference will result in poor and ineffective cutting. Thus, another aspect of the present teaching is that width 508 of the teeth in the reciprocating or moving upper 502 blades can be chosen to be wider than the cutting slots 506 in the stationary lower blades 504 in order to prevent interference and thus to improve cutting efficiency.

Another aspect of the shaving and grooming apparatus of the present teaching is that the radius 510, 512 of the upper and lower blades 502, 504 can be controlled to provide various effects. For example, a wider radius can be used to increase contact between the blades when they are assembled so that the blades press against each other while in use. Providing blades with intentional interference will result in blades that tend to have an intrinsic pressure between the blades to achieve good cutting effectiveness and performance. In one embodiment, the lower blade 504 is made with a tighter radius than the upper blade 502 such that when they are mated together, with the tabs and slots or alternative means, the blades 502, 504 in the cutting area 514 are squeezed together so that there is intimate contact between the upper and lower blades 502, 504 to enable a good cutting performance.

One feature of the shaving and grooming apparatus of present teaching is that the upper and lower blades 502, 504 can interlock in various ways. For example, the upper and lower blades 502, 504 can interlock with a tongue and groove configuration to keep them together. Such a configuration also allows for a thin lower blade. The upper and lower blades 502, 504 can also interlock with tabs and slits to reduce the number of parts needed for the assembly. In one embodiment, the upper and lower blades 502, 504 uses tabs formed into leaf springs with slots in the opposing blade such that the spring force needed to keep the upper and lower blades 502, 504 in sufficient pressure to cut is applied without the need for an external spring. The tabs and slots may also be used to ensure that the blades track along a predetermined path. The slots may be straight or curved to enable the upper blade 502 to follow a straight cutting path or a curved path.

Figure 6:
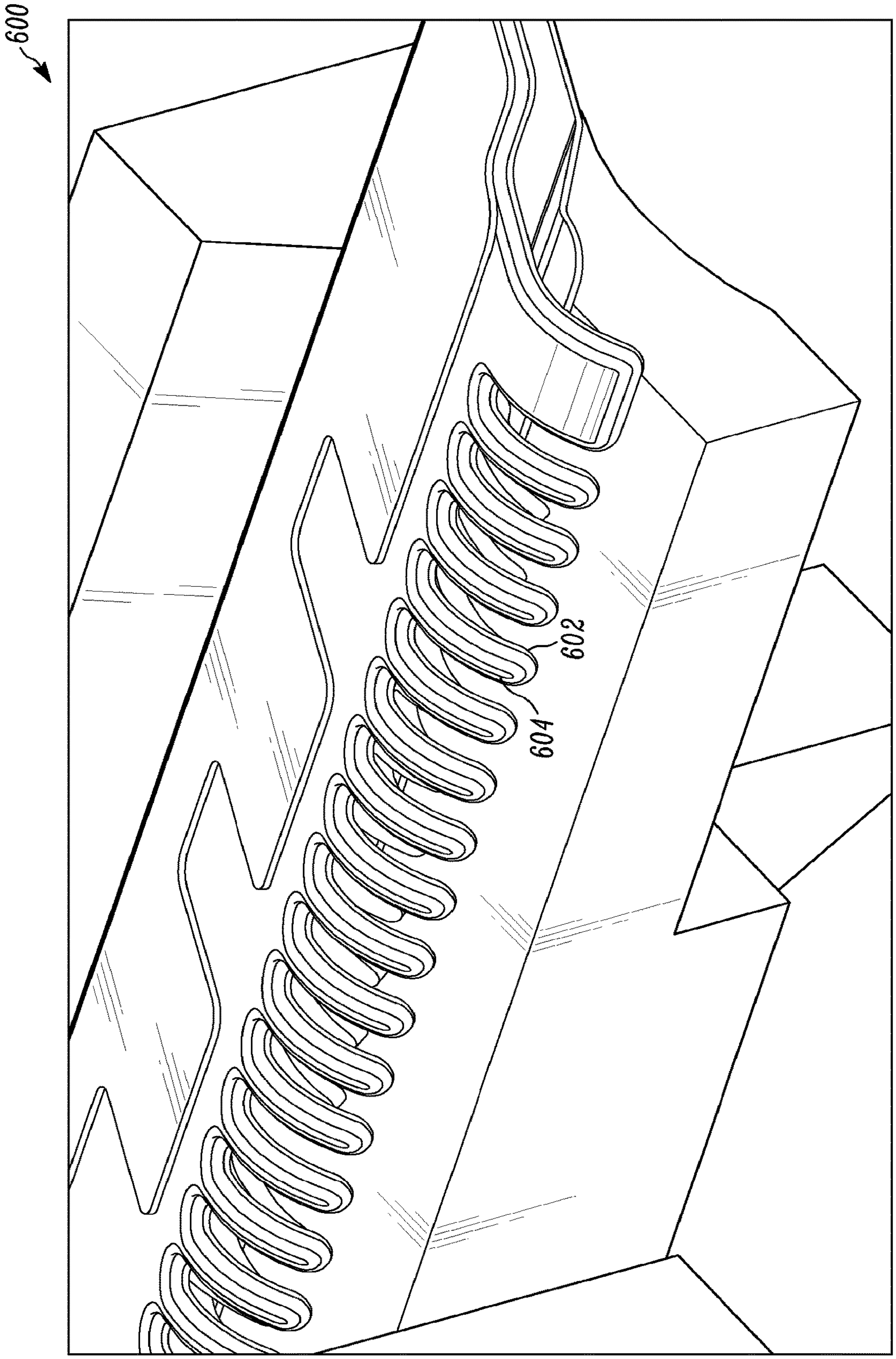
FIG. 6 illustrates a perspective bottom-view of a trimmer blade assembly according to one embodiment the present teaching that shows features that are designed to stiffen the blade according to the present teaching.

FIG. 6 illustrates a perspective bottom-view of a trimmer blade assembly 600 according to one embodiment the present teaching that shows features that are designed to stiffen the lower blade 602 according to the present teaching. In the embodiment shown in FIG. 6, the lower blade 602 includes ribbed-type features 604 that are designed to thicken certain areas of the lower blade 602 to stiffen the blade. In various other embodiments, the lower blades 602 include concave or convex features that are designed to stiffen the blades. In yet other embodiments, the lower blades 602 are very thin at the cutting surface, but have varying thicknesses along the blade that add to rigidity, while still allowing for flexible operation.

Figure 7:
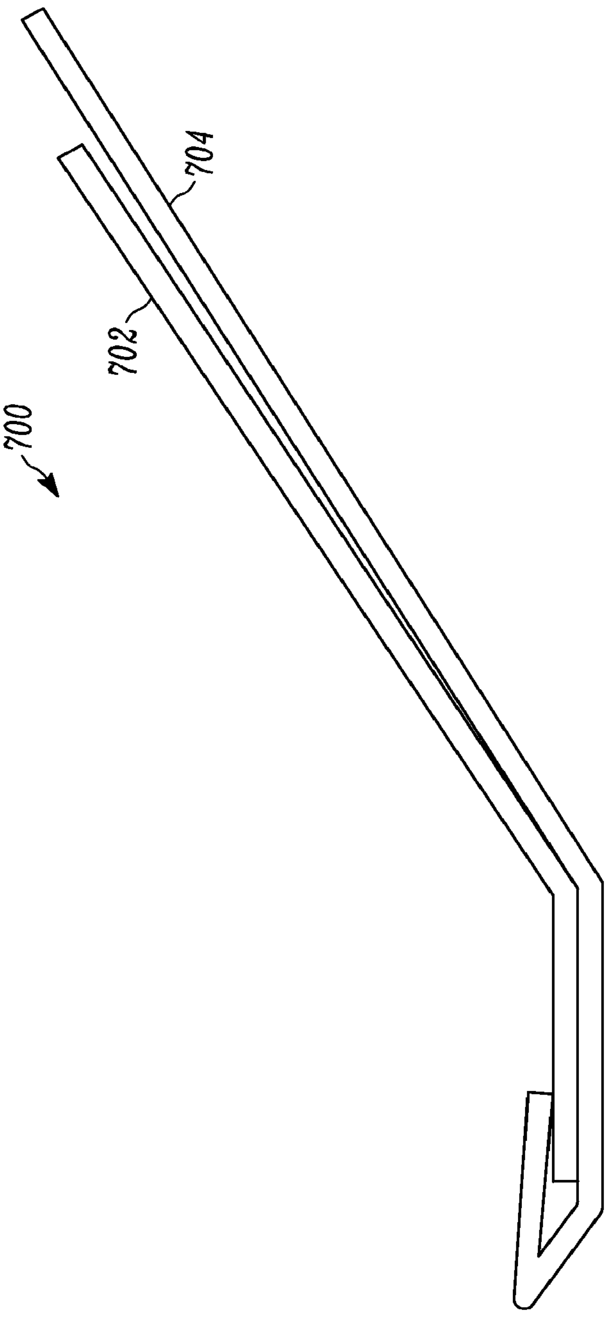
FIG. 7 illustrates a lower and upper blade where the lower blade wraps around and captures the upper blade in order to strengthen the lower blade according to the present teaching.

FIG. 7 illustrates a side-view of a blade assembly 700 including an upper 702 and a lower blade 704 where the lower blade 704 wraps around and captures the upper blade 702 in order to strengthen the lower blade 704 according to the present teaching. That is, the lower blade 704 is folded or bent over the upper blade 702 in order to partially support and strengthen the lower blade 704 with the upper blade 702. Such a lower blade 704 design enables the lower blade 704 to be relatively thin at the cutting surface while still providing enough cutting force to effectively cut the hair using the stiffness of the upper blade 702. In some embodiments, the folded lower blade 704 is designed to apply pressure between the lower and upper blades 702, 704. This folded lower blade 704 design allows the use of very thin lower blades that achieve very close shaves with an open trimmer architecture.

The very thin upper and lower trimmer blades of the present teaching can be formed by any one of numerous manufacturing processes. In one manufacturing process, a stamping and forming process is used. In another manufacturing process, laser and/or electron beam fabrication is used. In one process for making trimmer blades according to the present teaching, a first step includes etching. A second step includes a coining and forming operation. A third step includes a buffing operation. Alternatively, processes according to the present teaching can include etching, followed by buffing/polishing, and then followed by coining or forming.

Many types of etching can be used in the manufacturing process. In some methods of manufacturing, pure chemical etching or photochemical etching is used. In other methods of manufacturing, various types of plasma and dry etching techniques are used. These etching processes are in contrast to manufacturing techniques used for known trimmers that do not include etching because their thickness is generally too great for etching to be effective. Known trimmers typically have a flat "rake angle" on the trimmer teeth.

In one particular embodiment of blades according to the present teaching, photo-chemical etching is the primary means for creating the desired curved cutting edge at the point of cutting. In one particular manufacturing process, the upper and lower trimmer blades are photo-chemical etched to achieve the desired shape of the blades with the proper angled edge characteristics. Photo-chemical etching can be used to form a curved cross-section in teeth to create razor sharp cutting edges. Photo-chemical etching can also be used to outline the lower blade. In some manufacturing methods, the top surface of the lower blade is photo-chemically etched to connect the top and bottom portions of cutting slots such that the top most edge is left sharp by the chemical etching process to aid in the cutting of hairs. Photo-chemical etching can also be used to form ribbed structures or concavities to add stiffness.

Etching processes, however, generally leave sharp edges that are not suitable for positioning directly against the skin. The sharp edges will scrape and damage the skin, and can also potentially cut the skin. It is, therefore, highly desirable for any surface that can come in contact with the skin to be smooth. Various techniques can be used to reduce or eliminate sharp edges. For example, the etched surfaces of the lower blade can be electropolished to eliminate any sharp edges so that the surface of the blade contacting the skin is smooth and will not irritate or damage the skin.

In one embodiment of the present teaching, cutting slots between blades are only partially etched, leaving the top surface of the lower blade imperforated until after the electropolishing (or buffing, grinding etc) stages have been completed. Only then is the top surface of the blade etched, leaving the perforated slots with a sharp upper edge and smooth lower edges.

Additional process steps are generally required to condition the blade. For example, a coining operation can be used to flatten out the sharp edges, followed by the forming operation to achieve the final shape of the blade curve or bends. In order to facilitate this, an exaggerated under-cut can be made by over-etching to create thin metal sections that can be easily bent down in the coining operation to create a smooth surface.

In some manufacturing processes, a laser, plasma source, and/or e-beam system is used to make the sharp edges on the skin-facing surface, which creates a smooth beaded surface that can then come in contact with the skin without damaging it. By etching the skin-facing surface to create a thin overhang, it is then possible to laser etch a small amount of material to get a smooth edge. One feature of the present teaching is a manufacturing process that includes the step of etching a thinner section of overhanging material to enable a more complete melting by reducing the amount of material that must be melted to create the beaded smooth edge.

These etching processes are in contrast to known manufacturing techniques used for known trimmers which do not include etching because their thickness is generally too great for etching to be effective. Known trimmers typically have a flat "rake angle" on the trimmer teeth. In one embodiment of blades according to the present teaching, photochemical etching is the primary means for creating the desired curved cutting edge at the point of cutting. The present teaching is in part the realization that the use of etching, and in particular, photo chemical etching processes, allows the blades to cut hair with less force by using a razorblade-like, thin edge compared with the prior art rake angle designs.

Some manufacturing processes include applying low friction coatings. For example, PTFE or a similar low friction coating to fill in the undercuts and smooth out any edges as well as to aid in the smooth gliding of the blade on the skin, and to assist with cutting the hairs by lowering the coefficient of friction for the hair cutting operation. The surfaces can be conditioned by etching to improve adhesion of the coatings. Chrome plating or other metal plating operations may also be used to fill-in the sharp corners on the skin-facing surfaces to eliminate the sharp edges and to avoid skin damage. Electroplating is another way to dull the edges so that they don't damage the skin.

One or multiple rows of upper and lower blades according to the present teaching can be mounted in various cartridges. In some embodiments, the cartridges are disposable. The cartridges are attached to or are attachable to various types of arms. The arms can provide a variety of different features to enhance the user's experience.

Figure 8:
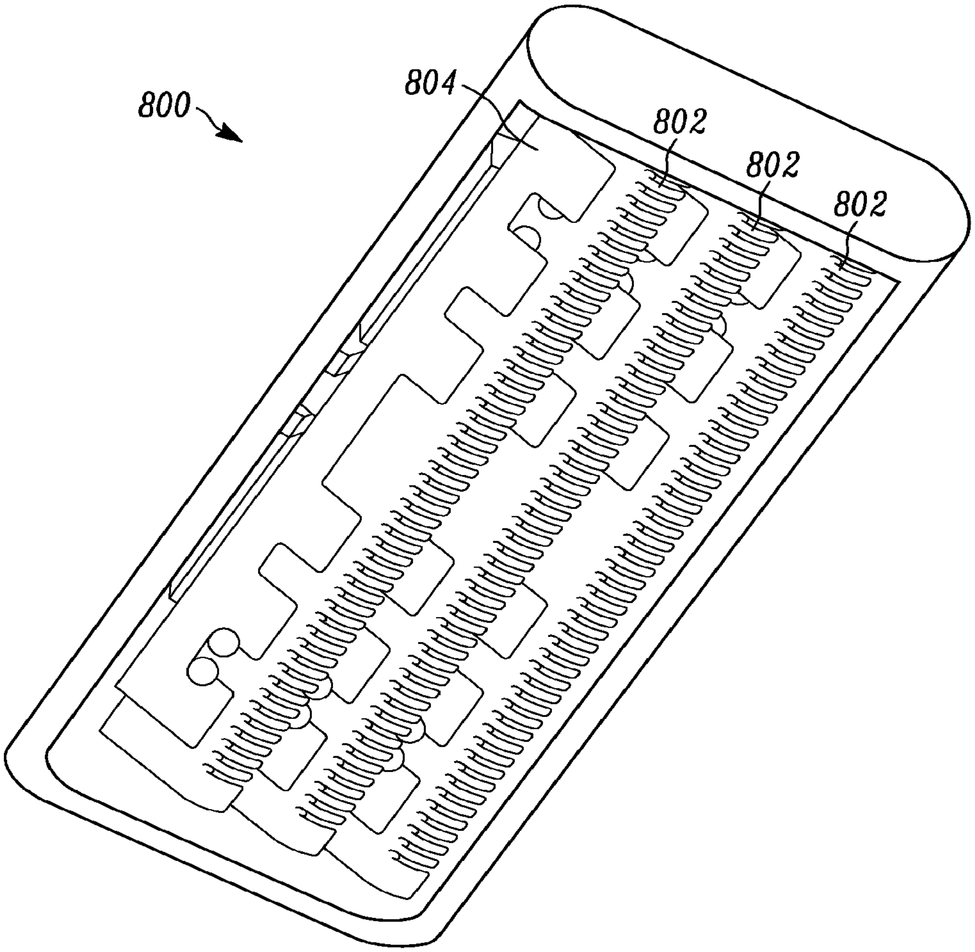
FIG. 8 illustrates a cartridge that includes three rows of upper and lower blades according to the present teaching.

FIG. 8 illustrates a cartridge 800 that includes three rows 802 of upper and lower blades according to the present teaching. Another feature of the shaving and grooming apparatus of the present teaching is that a plurality of rows of upper and lower blades can be positioned in a fixed or disposable blade cartridge. Using disposable blade cartridges is advantageous because the very thin metal used for the blades can be made very sharp without concern for the overall blade life. In contrast, known trimmers use much more rugged blades that are made of thick metal which require occasional mechanical sharpening that is often accomplished using various types of lapping procedure. It is highly undesirable to have a need for such mechanical sharpening procedures in a consumer product. Many consumers simply will not buy such a product. It is much more desirable for a consumer shaving and grooming apparatus, such as a trimmer, to have economical replacement blades available that the end user can simply replace with an inexpensive replacement cartridge.

In some embodiments, the cartridge 800 includes a spacer 804 that positions the blades a predetermined distance from the cutting surface. Numerous types of spacers can be used. For example, the spacer 804 can be a flat sheet of metal having a thickness that is in the range of 0.01 mm to 0.2 mm thick. The spacer 804 can position the blades at various distances relative to the surface of the skin. For example, the spacer 804 can space the blade at a distance that is in the range of 0.01 mm to 0.1 mm.

Figure 9:
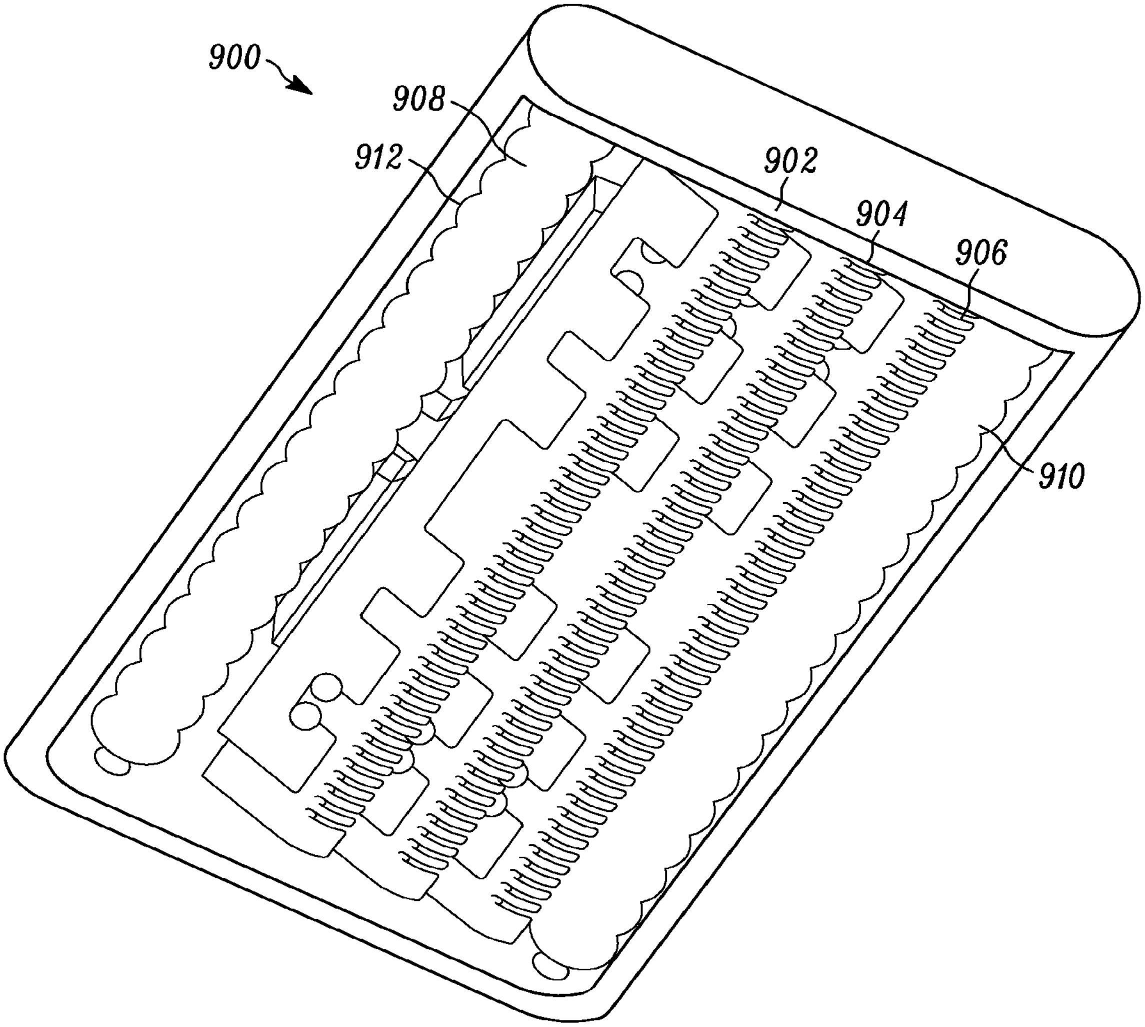
FIG. 9 illustrates a cartridge that includes three rows of upper and lower blades positioned inside front and rear rollers according to the present teaching.

FIG. 9 illustrates a cartridge 900 that includes three rows of upper and lower blades 902, 904, and 906 positioned inside front and rear rollers 908, 910 according to the present teaching. In some embodiments, the front and rear rollers 908, 910 are formed of plastic or rubber. Also, in some embodiments, the front and rear rollers 908, 910 include texturing with ribs 912 that are linear or radially disposed.

In various embodiments, the front and rear rollers 908, 910 are positioned to provide suspension and/or to provide more frictionless movement against the skin. The rollers 908, 910 are positioned so that an additional upward force is applied on the upward force of the lower blade during operation. Thus, in one embodiment of the shaving and grooming apparatus according to the present teaching, at least one of the upper and lower roller 908, 910 is positioned to apply a force to the blades so as to enhance the effectiveness of the cutting.

One feature of the shaving and grooming apparatus of the present teaching is that each of the rows of upper and lower blades can be designed to perform a different function to cut hair to any length. For example, the first row of upper and lower blades 902 can be designed with a thicker lower blade and wider teeth spacing to make a first cutting pass that results in hairs being clipped to a short length, but not to a shaved length. The second row 904 of upper and lower blades can be designed with a thinner lower blade and more tightly-spaced teeth to trim the hairs to yet a shorter length. A third row 906 of upper and lower blades can be designed with a very thin lower blade having a distance that is between 0.01-0.1 mm from the skin to the cutting area so that there are tightly spaced teeth that shave the hair to its final length.

Another feature of the shaving and grooming apparatus of the present teaching is that the gaps between the teeth may be slits of between 0.01-0.5 mm in width and may have a variety of shapes including straight rectilinear, as well as curved or serpentine shapes, to enable different cutting angles of the hairs. Each set of blades may have one or several different types of shaped cutting slots. That is, one or more of the first, second, and third rows 902, 904, and 906 can have the same or different types of upper and lower blade slot shapes, with the other rows having either the same or different upper and lower slot shapes.

In one example, the first row 902 of cutting blades can have straight slots, the second row 904 can have curved slots, and the third row 906 can have serpentine slots. In another example, the first row 902 can have curved and serpentine slots between the upper and lower blades, the second row 904 can have straight and curved slots between the upper and lower blades, and the third row 906 can have serpentine and straight slots between the upper and lower blades. Thus, one aspect of the present teaching is that a shaving and grooming apparatus can be constructed with different slots that provide different cutting action for each successive pass over the surface of the skin.

Another feature of the shaving and grooming apparatus of the present teaching is that the various rows of blades can have different angles of attack against the skin. The various rows of blades can also have different amounts of curvature in their tips. For example, the first row of upper and lower blades 902 can have a significant curve and the second row 904 of upper and lower blades can be more flat. The third row of upper and lower blades 906 can have yet a flatter angle of attack against the skin surface.

Figure 10:
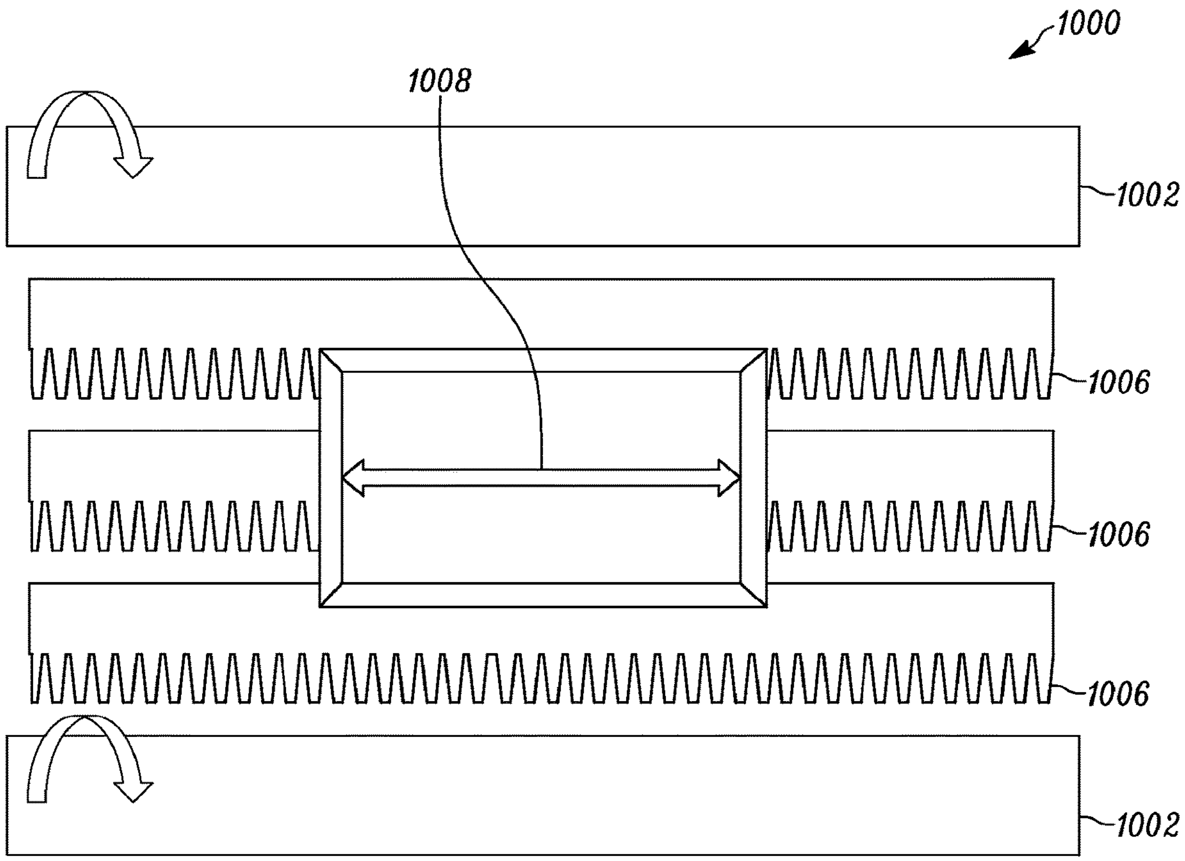
FIG. 10 illustrates a top-view of one embodiment of a shaving and grooming apparatus of the present teaching that include front and back rollers and oscillating upper cutting blades.

Another feature of the shaving and grooming apparatus of the present teaching is that an oscillating member can be used to move one or more blades to improve cutting efficiency. FIG. 10 illustrates a top-view of one embodiment of a shaving and grooming apparatus 1000 of the present teaching that include front and back rollers 1002, 1004 and oscillating upper cutting blades. In various embodiments, the front and back rollers 1002, 1004 can be plastic or rubber rollers. The rollers 1002, 1004 may have texture or ribs that are linearly or radially disposed. The top-view also shows oscillating upper cutting blades 1006. In some embodiments, each of the three upper cutting blades 1006 is moved by a single oscillating member 1008.

Figure 11:
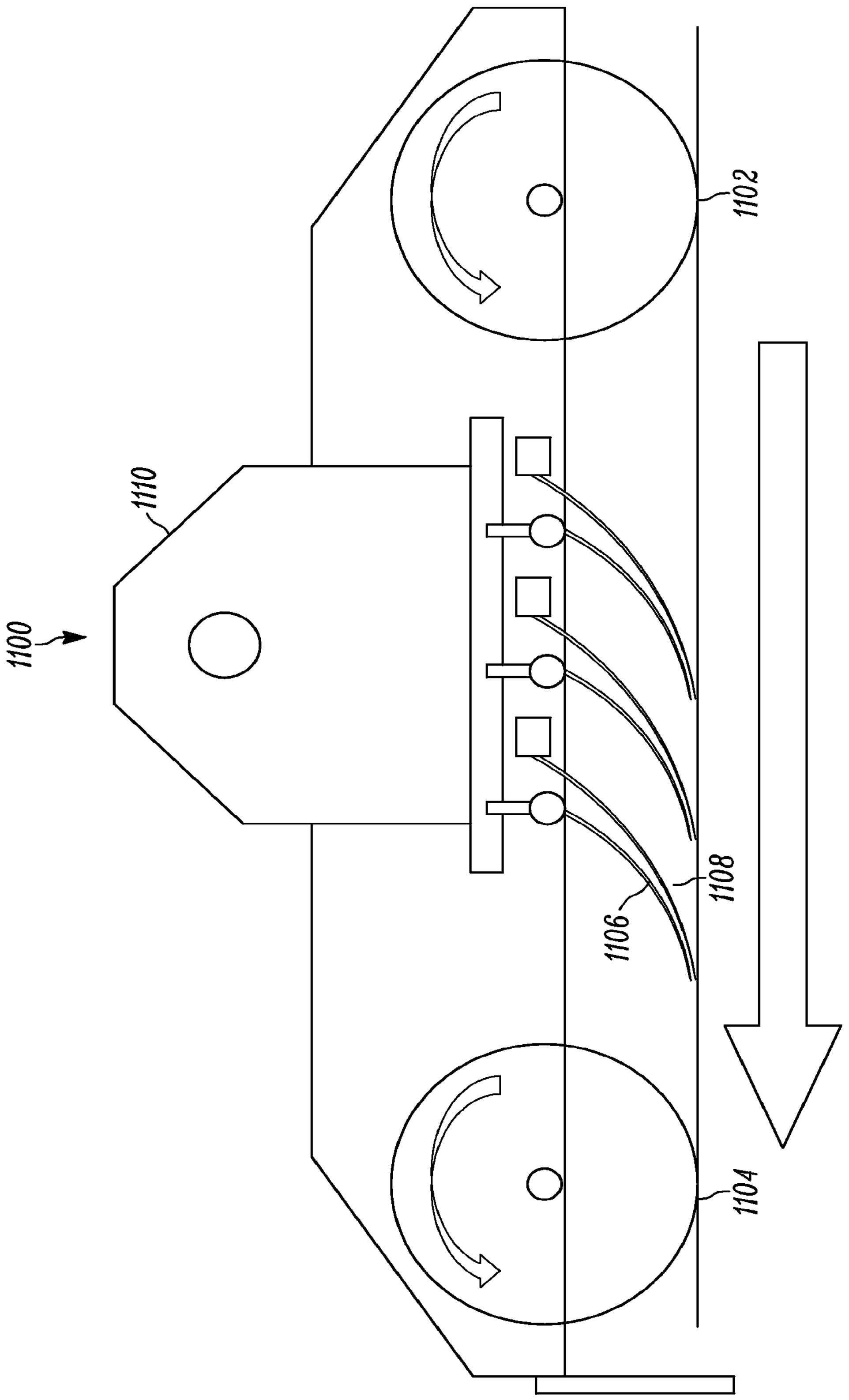
FIG. 11 illustrates a side-view of one embodiment of a shaving and grooming apparatus of the present teaching that include front and back rollers and oscillating upper blades mechanically coupled to a motor drive unit.

FIG. 11 illustrates a side-view of one embodiment of a shaving and grooming apparatus 1100 of the present teaching that include front and back rollers 1102, 1104 and oscillating upper blades 1106 mechanically coupled to a motor drive 1110. Another feature of the shaving and grooming apparatus of the present teaching is that the blade design allows the motor drive 1110 to be quieter than known trimmers or electric shavers. In some embodiments, the motor drive 1110 for the blades uses a cam that converts rotational motion to linear motion and thus does not exhibit the typical "buzzing sound" associated with trimmers.

The front and back rollers 1102, 1104 provide blade suspension and also orient the upper and lower blades 1106, 1108 with respect to the user's skin so that the upper and lower blades 1106, 1108 sit against the user's skin in one preferred orientation. The preferred orientation can be chosen for one or both of effective cutting and for reducing skin irritation due to friction, or due to having the points or tips of the blades touch the skin surface. In contrast, all known trimmer systems are considered to be "free hand" and thus require some operator skill.

In one embodiment, the front and back rollers 1102, 1104 are dimensioned to keep the distance between the skin and the upper and lower blades 1106, 1108 in the range of 0.01-0.1 mm. In some embodiments, a flat metal member is used to keep trimmer blades at a predetermined distance and predetermined pressure to the skin surface. For example, a flat metal of between 0.01 mm-0.2 mm can be used to space the upper and lower blades 1106, 1108 from the user's skin, with some particular embodiments being between 0.02-0.08 mm.

In addition, the front and back rollers 1102, 1104 can be designed and positioned such that the cutting area of the upper and lower blades is substantially parallel to the surface of the skin during the cutting operation. In contrast, known trimmers operate at an angle to the surface of the skin, such that the cutting areas are further away, leaving longer stubble.

The upper and lower blades 1106, 1108 flex when applied to the surface of the skin, thereby applying pressure contact to the user's skin. The term "flex" as used herein means to slightly bend, deform, or move. This pressure contact with user's skin serves two purposes. First, the pressure contact depresses the skin to cause hairs to protrude, thereby increasing the pressure between the blades, and thus improving the cutting performance. Second, the pressure contact allows the blades to flex as they pass over the uneven surface of skin to avoid causing skin irritation or damage.

In some embodiments, the upper blade 1106 is sharper than the lower blade 1108 so that the upper and lower blades together act as the spring thereby eliminating the need for a separate spring. With this geometry, the tolerances in cutting area can be less than 0.1 mm. In one specific embodiment, the cutting slots between the upper and lower blades 1104, 1106 can be between 0.5 and 0.01 mm in width. A sharp upper blade-rake angle of greater than 25 degrees can be used.

Another feature of the shaving and grooming apparatus of the present teaching is that more than one blade can be positioned to cut in the same direction. For example, the lower blade 1108 can first cut a skin region, and then the upper blade 1106 can then cuts the same region. This is in contrast to known trimmer blades that are not aligned such that they cut in the same direction.

Because the shaving and grooming apparatus includes thin flexible blades 1106, 1108, it can be operated with a pull-like motion that is commonly used to operate wet shaving products like the Gillette Mach 3. One feature of the shaving and grooming apparatus of the present teaching is that it can be made to look like a wet blade shaver so the user will more naturally know how to operate it.

In contrast, known trimmers are designed for a push-to-cut motion that has known disadvantages. Known conventional trimmers cannot be effectively used with a pull cut because they are designed with the motor drive unit 1110 behind the blade. In this configuration, the user cannot effectively hold the device and pull it without causing the trimmer blade edges to gouge and dig into the user's skin causing irritation and skin damage and consequently a risk of infection.

There are known combination trimmers that include both a foil shaver and a mid cutter where one of the trimmer blades is positioned for a pull cut. An example of such a trimmer is the Philips Bodygroom. However, this product is used in combination with a foil shaver and is only intended to trim long hairs such that they can then pass more successfully into the foil cutting center cutter. Thus, one important aspect of the present teaching is a shaving and grooming apparatus design that includes a trimmer only apparatus with curved blades and blade suspension that is operated with a pull cut motion. The resulting trimmer design is capable of cutting hairs to a shave length that is less than 0.1 mm thick.

Another feature of the shaving and grooming apparatus of the present teaching is that it is capable of cutting long hairs. Linear shavers offer the advantage of being able to cut any length hair. There are currently no commercially available products that combine the closeness of an electric shaver with the robustness and fast cutting action of all lengths of hairs of a trimmer. This is at least in part due to the fact that conventional trimmer blades are not thin enough to provide the user with a shave-like stubble length. Conventional thinking is that trimmer blades must have good rigidity properties in order for the trimmer blades to be aligned and cut properly. One aspect of the present teaching is the realization that very thin blades can be used in trimmers.

Figure 12:
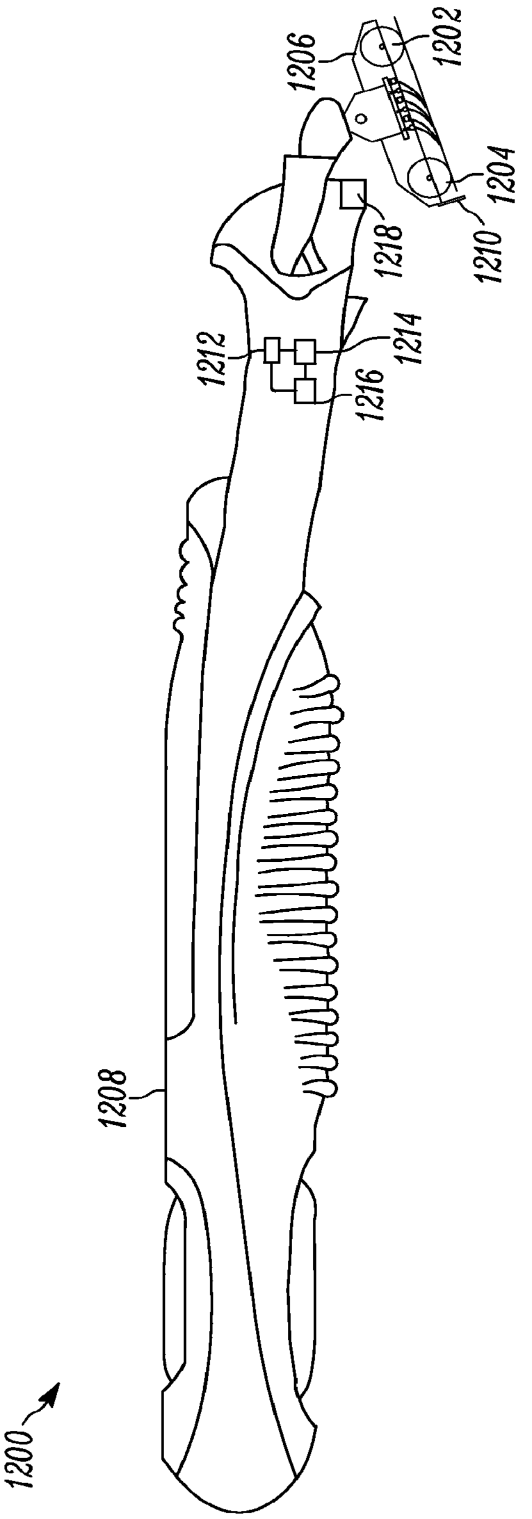
FIG. 12 illustrates a side-perspective view of the shaving and grooming apparatus described in connection with FIG. 11 that include front and back rollers and oscillating upper blades with the cartridge attached to a handle.

FIG. 12 illustrates a side-perspective view of the shaving and grooming apparatus 1200 described in connection with FIG. 11 that include front and back rollers 1202, 1204 and oscillating upper blades 1106 (FIG. 11) with the cartridge 1206 attached to a handle 1208. In many embodiments, the cartridge 1206 is a user replaceable cartridge.

Another feature of the shaving and grooming apparatus of the present teaching is that a sensor 1210 can be included to detect the amount of skin area that has been covered by the cartridge 1206 in order to notify the user when it is appropriate to replace the cartridge 1206. For example, the sensor 1210 can be integrated into one or both of the front and back rollers 1202, 1204. The sensor 1210 can also be a photo/optical device positioned in the cartridge 1206 that is used to track movement to detect the amount of the user's skin covered since a new cartridge 1206 was installed. The sensor 1210 can be electrically connected to a power source 1212 and an indicator in the handle 1208. For example, the indicator can be a light indicator, a sound indicator, or a vibration indicator. In one embodiment, a Bluetooth transmitter is included in the handle 1208 to transmit indicator signals to another device, such as a user's smart phone or computer.

In some embodiments, the shaver handle 1208 is sized for a minimum battery size that contains enough charge to support a limited, but acceptable number of shaves for the consumer. In some embodiments, the shaving and grooming apparatus' power source may be recharged by wireless means. In some embodiments, the shaving and grooming apparatus can include a cradle that contains a second battery to charge the shaver without a wall plug power source. In some embodiments the cradle may include a magnetic lock to secure the shaver. In some embodiments the shaving and grooming apparatus' power source uses a USB-type microplug.

In one embodiment, a processor 1214 is positioned in the handle 1208 that interfaces with the sensor 1210 in the cartridge 1206 that calculates the amount of time that the apparatus has been operated since a new cartridge 1206 has been inserted. The processor 1214 can also track the rotations of the rollers 1202, 1204 within the cartridge 1206 to calculate the approximate skin area covered with the upper and lower blades 1106, 1108 (FIG. 11) and use this information to indicate that a new cartridge 1206 should be inserted.

In one embodiment, the sensor 1210 interfacing with the processor 1214 can be used to turn the blade drive motor 1110 (FIG. 11) off when certain conditions are met, such as when the blades have been used for a certain predetermined time or have traversed a predetermined area. Various programming options can be implemented, such as allowing the user to switch the system back on for a fixed amount of time (for example, 30 seconds) before switching the motor drive 1110 off again. This will allow the user to continue shaving with the device, but it will be a continual reminder that the cartridge 1206 is in need of replacement. Numerous other user reminders are also possible, such as pulsing the drive motor 1110 on and off with a fixed period to notify and remind the user to replace the cartridge 1206. User reminders may also be accompanied with a vibrator, a speaker, or a light-based indicator to ensure that the user is informed of the reason for the different operating mode. For example, a vibration sensor can be used to provide a fixed or unlimited number of shakes for continued use.

In some embodiments, the shaving and grooming apparatus of the present teaching includes a memory 1216 in the handle 1208 that interfaces with a microprocessor 1214 positioned in the handle 1208. The memory 1216 can be used to store usage data, such as a how many uses by a particular cartridge and intervals between replacements of cartridges. In another embodiment, an RFID tag is positioned in the handle 1208 that has a unique ID that can be read by an RFID reader.

Another feature of the shaving and grooming apparatus of the present teaching is that an illumination source 1218, such as a light source emitting radiation in the range of 400-1200 nm light, can be positioned to apply radiation to the skin being shaved or trimmed to cause localized heating at the hair shaft being cut. In various embodiments, the radiation is delivered to the skin through a waveguide or directly emitted from the source.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A trimmer blade assembly for a shaving and grooming apparatus comprising:

a) a lower curved cutting surface stationary blade comprising a plurality of teeth having cutting edges, each of the plurality teeth being shaped so that the cutting edges ride above a skin surface so that skin fills in an area between the teeth allowing the skin to get closer to cutting surfaces; and b) a curved movable upper blade disposed on top of the lower curved cutting surface stationary blade having a plurality of teeth that when the lower curved cutting surface stationary blade and the curved movable upper blade are pressed together they are frictionally engaged with a radius of a bend in the lower curved cutting surface stationary blade being smaller than a radius of a bend in the curved movable upper blade and, a cutting pressure is generated between the blades which causes the lower curved cutting surface stationary blade to unfurl somewhat aiding and improving effectiveness of a cut, wherein the lower curved cutting surface stationary blade is thinner than the curved movable upper blade.

2. The trimmer blade assembly of claim 1 wherein at least some of the plurality of relatively thick trapezoidal teeth comprising the stationary lower blade have different levels of sharpness compared with at least some other of the plurality of relatively thick trapezoidal teeth comprising the stationary lower blade.

3. The trimmer blade assembly of claim 1 wherein all of the plurality of relatively thick trapezoidal teeth comprising the stationary lower blade have a same level of sharpness.

4. The trimmer blade assembly of claim 1 wherein at least some of the plurality of relatively thin trapezoidal teeth comprising the moveable upper blade have different levels of sharpness compared with at least some other of the plurality of trapezoidal teeth comprising the movable upper blade.

5. The trimmer blade assembly of claim 1 wherein all of the plurality of relatively thin trapezoidal teeth comprising the moveable upper blade have a same level of sharpness.

6. The trimmer blade assembly of claim 1, wherein at least some of the plurality of teeth comprising the curved moveable upper blade have a more aggressive cutting edge compared with at least some of the plurality of teeth comprising the lower curved cutting surface stationary blade.

7. The trimmer blade assembly of claim 1, wherein all of the plurality of teeth comprising the curved moveable upper blade have a more aggressive cutting edge compared with all of the plurality of teeth comprising the lower curved cutting surface stationary blade.

8. The trimmer blade assembly of claim 1 wherein at least some of the plurality of relatively thin trapezoidal teeth comprising the moveable upper blade are formed of a material that is different from a material forming at least some of the relatively thick trapezoidal teeth.

9. The trimmer blade assembly of claim 1 wherein all of the plurality of relatively thin trapezoidal teeth comprising the moveable upper blade are formed of a material that is different from a material forming at least some of the relatively thick trapezoidal teeth.

10. The trimmer blade assembly of claim 1 wherein at least some of the plurality of relatively thin trapezoidal teeth comprising the moveable upper blade are formed of a material that is different than a material forming other ones of the plurality of relatively thin trapezoidal teeth the movable upper blade.

11. The trimmer blade assembly of claim 1 wherein at least some of the plurality of relatively thick trapezoidal teeth comprising the stationary lower blade are formed of a material that is different than a material forming other ones of the plurality of relatively thick trapezoidal teeth comprising the stationary lower blade.

12. The trimmer blade assembly of claim 1, wherein the plurality of teeth comprising the lower curved cutting surface stationary blade and the plurality of teeth comprising the curved movable upper blade is are both configured so that when the lower curved cutting surface stationary blade and the curved movable upper blade are pressed together a counter force is formed against the lower curved cutting surface stationary blade and the curved movable upper blade.

13. The trimmer blade assembly of claim 1, wherein the plurality of teeth comprising the lower curved cutting surface stationary blade and the plurality of teeth comprising the curved movable upper blade are both configured so that when the lower curved cutting surface stationary blade and the curved movable upper blade are pressed together, pressure is generated between the blades improving an effectiveness of the cut.

14. The trimmer blade assembly of claim 1 wherein at least some of the plurality of relatively thin trapezoidal-shape teeth comprising the movable upper blade deform when they open to accept the plurality of trapezoidal teeth comprising the stationary lower blades.

15. The trimmer blade assembly of claim 1 wherein at least some of the plurality of relatively thin trapezoidal-shape teeth comprising the movable upper blade are thin enough to flex so that they press up against a surface of skin.

16. The trimmer blade assembly of claim 1 wherein at least some of the plurality of relatively thin trapezoidal teeth comprising the movable upper blade have a more aggressive cutting edge compared with at least some of the others of the plurality of relatively thin trapezoidal teeth comprising the movable upper blade.

17. The trimmer blade assembly of claim 1 wherein all of the relatively thin trapezoidal teeth comprising the movable upper blade have a same cutting edge.

18. The trimmer blade assembly of claim 1 wherein all of the relatively thick trapezoidal teeth comprising the stationary lower blade have a same cutting edge.

19. The trimmer blade assembly of claim 1 wherein all of the relatively thick trapezoidal teeth comprising the stationary lower blade and all of the relatively thin trapezoidal teeth comprising the movable upper blade have a same cutting edge.

* * * * *